Dec. 11, 1934.  R. A. WILKINS  1,983,785
ELECTROLYTIC APPARATUS
Filed Aug. 30, 1930  4 Sheets-Sheet 1
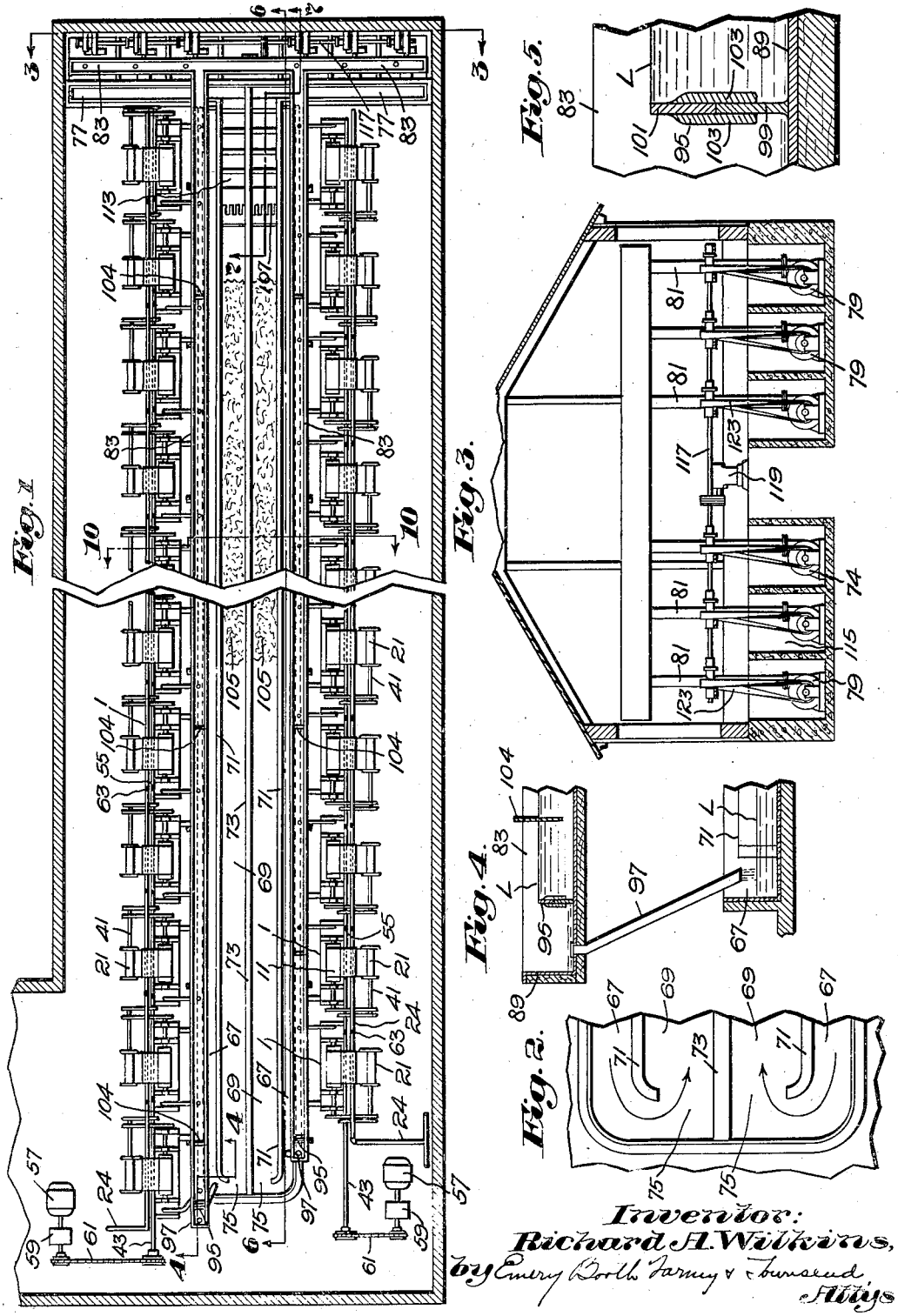
Inventor:
Richard A. Wilkins,
by Emery Booth Varney & Townsend
Attys

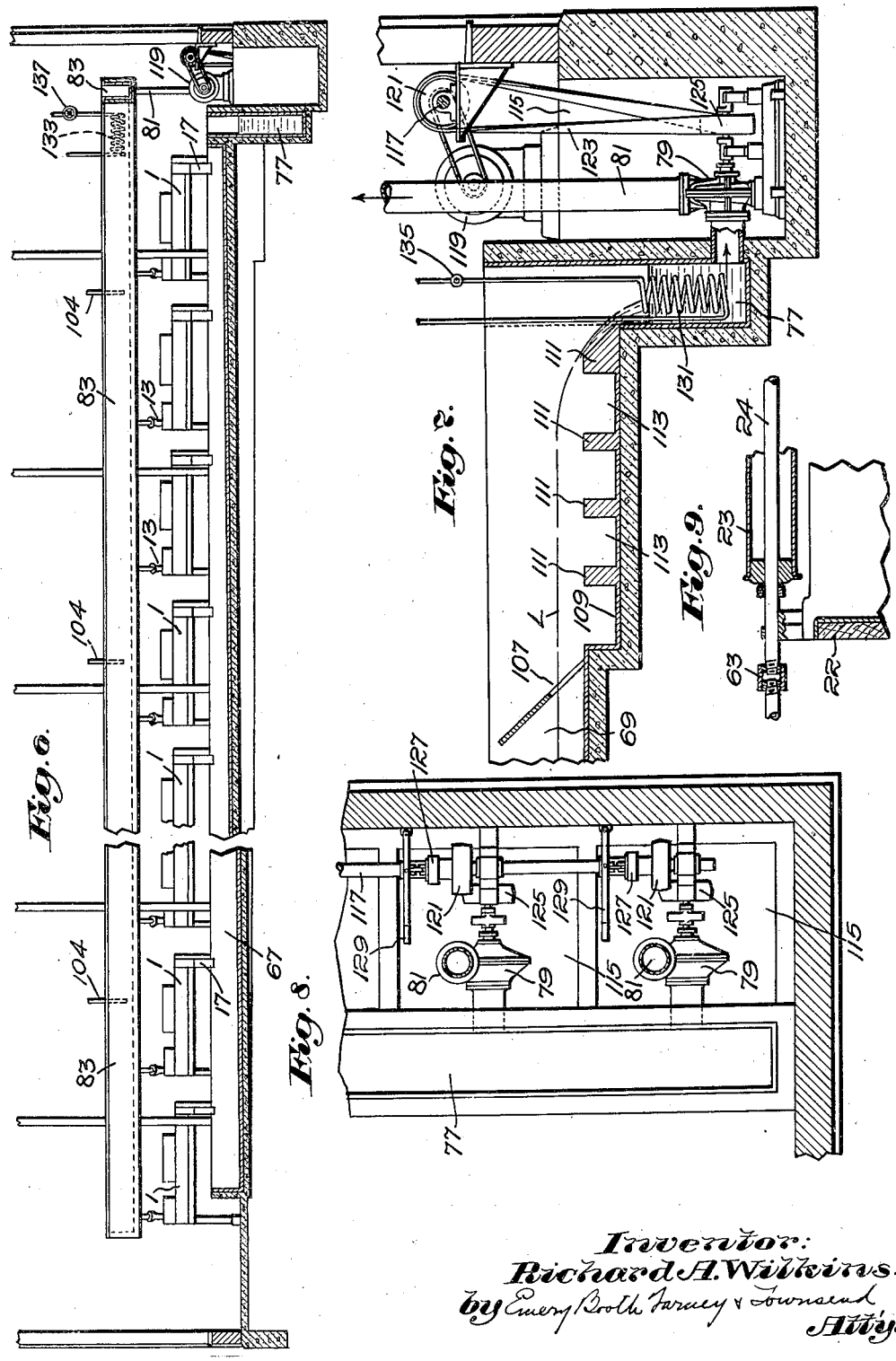

Dec. 11, 1934.        R. A. WILKINS        1,983,785
ELECTROLYTIC APPARATUS
Filed Aug. 30, 1930        4 Sheets-Sheet 3
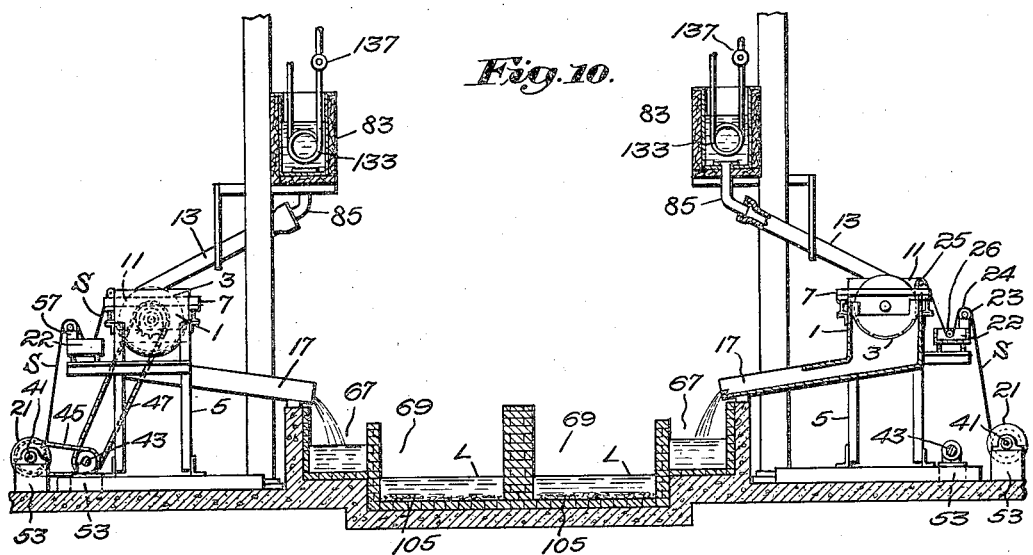
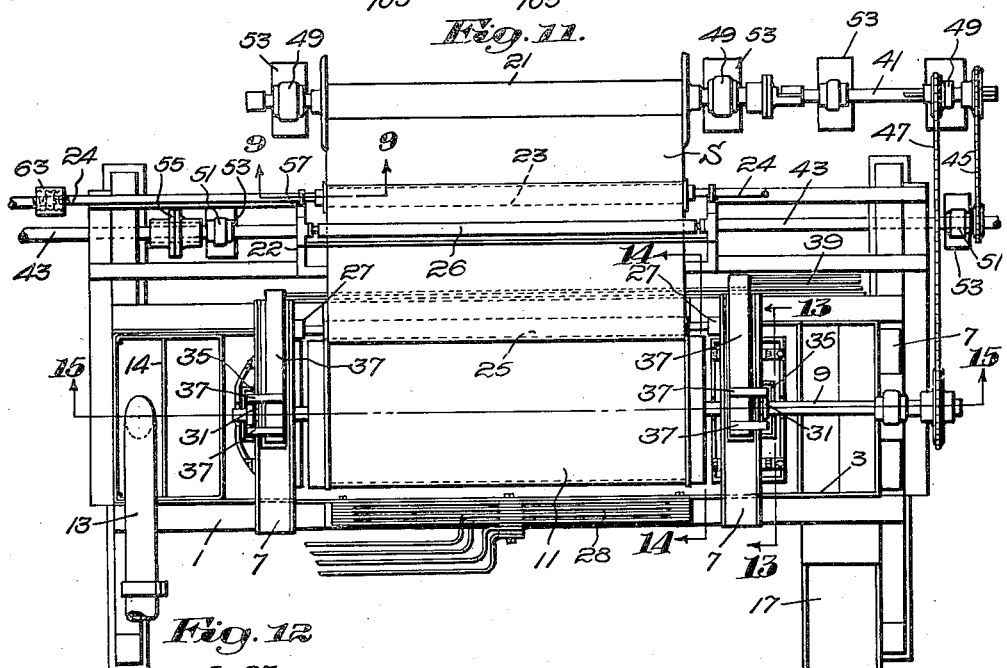
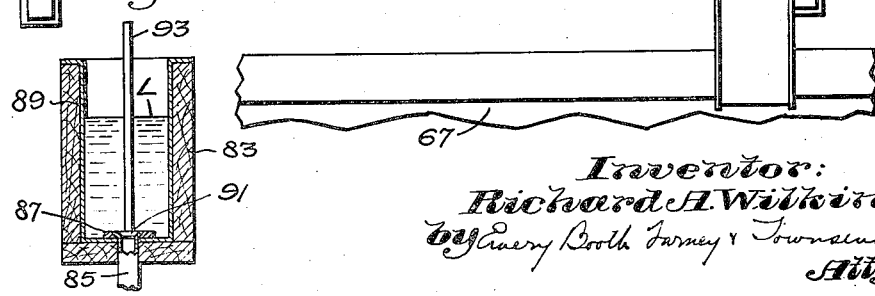

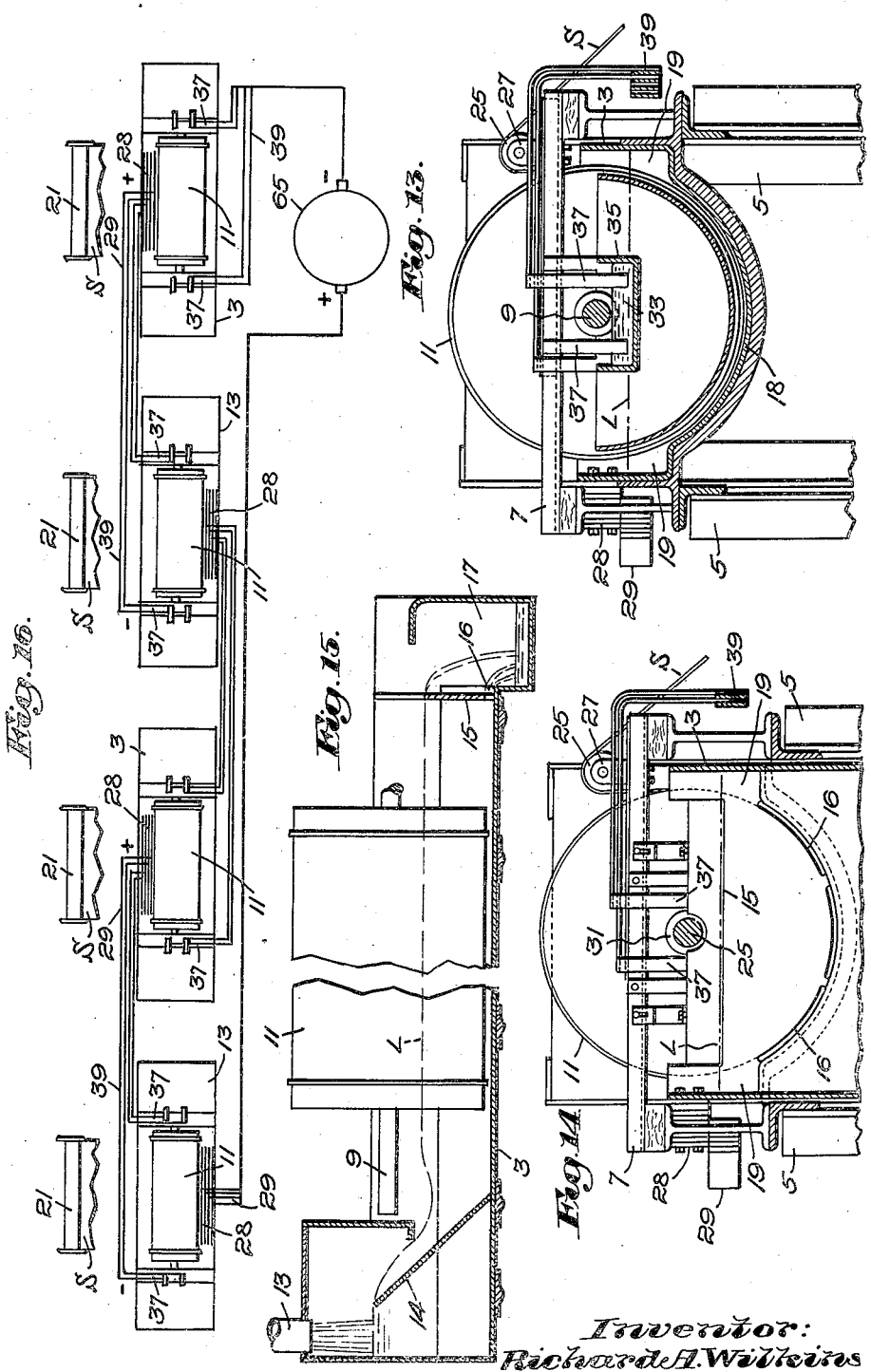

Patented Dec. 11, 1934

1,983,785

UNITED STATES PATENT OFFICE 1,983,785

ELECTROLYTIC APPARATUS

Richard A. Wilkins, Beverly, Mass., assignor to Industrial Development Corporation, Boston, Mass., a corporation of Maine Application August 30, 1930, Serial No. 478,903

13 Claims. (Cl. 204—5)

My invention relates to electrolytic methods and apparatus, particularly but not exclusively adapted for producing electro-deposited sheet metal, as for example, sheet copper.

The invention will be best understood from the following description when read in the light of the accompanying drawings of one embodiment of the invention, the scope of which latter will be more particularly pointed out in the appended claims.

In the drawings:—

Fig. 1 is a plan of a plant for producing sheet metal according to the invention;

Fig. 2 is an enlarged view of the left hand end of the collecting and replenishing troughs according to Fig. 1;

Figs. 3 and 4 respectively are sections on the lines 3—3 and 4—4 of Fig. 1;

Fig. 5 is a section on an enlarged scale of the dam or weir shown in Fig. 4;

Figs. 6 and 7 respectively are sections on the lines 6—6 and 7—7 of Fig. 1, Fig. 7 being on an enlarged scale;

Fig. 8 is a plan on an enlarged scale of several pump units and associated parts shown by Figs. 3 and 7;

Fig. 9 is a section on the line 9—9 of Fig. 11;

Fig. 10 is a section on the line 10—10 of Fig. 1, on an enlarged scale;

Fig. 11 is a plan of the electro-depositing cells and associated parts;

Fig. 12 illustrates a detail;

Figs. 13, 14 and 15 respectively are sections on the lines 13—13, 14—14 and 15—15 of Fig. 11 with parts omitted; and Fig. 16 is a wiring diagram.

The particular embodiment of the invention herein described is particularly adapted for producing metallic sheets, such as thin copper sheets. The present application is more particularly concerned with a plant containing a number of electro-depositing units or cells, the latter forming the subject matter of my pending application Serial No. 478,905, filed herewith, these cells herein being described with only sufficient particularity to show how they coact in the present invention.

Referring particularly to Figs. 10, 11, 13, 14 and 15, each cell 1 comprises a trough 3 of lead or other suitable conductive material insoluble in the electrolyte. As shown, the troughs are supported on suitable framework 5, which framework also carries in insulated relation thereto spaced bars 7 spanning the troughs, these bars rotatably supporting the shaft 9 of a cathode drum 11 on which the copper sheet S is deposited.

In practice the metal bearing electrolyte enters the trough 3 constituting the insoluble anode through a conduit 13, and flows over the dam 14, Fig. 15, and then through the trough in a swiftly flowing, continuous stream in the space between said trough and the slowly rotating cathode. The major part of the electrolyte after passing the cathode flows under the weir 15 through the orifices 16 (Figs. 14 and 15), and the remaining part over this weir, and then is discharged from the trough 3 through a chute 17, Figs. 10 and 11. The weir 15 serves to maintain a constant depth of electrolyte through the length of the portion of the trough occupied by the cathode, the upper surface L of the electrolyte being for a purpose hereinafter described above the arcuate portion 18 of the trough, as best shown in Fig. 13, so as to flow through channels 19 of increased width adjacent said level.

The sheet S as it is formed by electro-deposition on the cathode is stripped from the latter and wound on suitable rolls 21, the length of strip between the latter and the cathode passing through a washing and oil coating tank 22 carried by the framework 5 in insulated relation thereto and over a drying roll 23. The drying roll, as illustrated by Fig. 9, is rotatably supported on a steam pipe 24 carried by the tank 19 so as to be insulated from the framework 5. Other suitable rolls 25 and 26 are provided for guiding the sheet S in its passage from the cathode to the roll 21, the roll 25 being rotatably supported at opposite ends on bearings 27 carried by the insulated bars 7.

As shown (see Figs. 11 and 13) each trough 3 has secured to the side thereof a longitudinally extending bus-bar 28 in electrical contact therewith substantially throughout a distance corresponding to the length of the cathode, this bus-bar being connected by conductors 29 to a source of electromotive force furnishing the depositing current. The cathode is so constructed that the surface thereof is in electrical communication with the shaft 9. As shown, said shaft has thereon at each end of the cathode a ring 31, Figs. 11 and 13, of conductive material which dips into a body of mercury 33 positioned in a suitable container 35 carried by the adjacent insulated bars 7. Dipping into the body of mercury are terminal portions 37 of bus-bars 39, which latter are connected to the source of electromotive force for supplying the depositing current in such way that the cathode 11 is negative relative to the conductive trough 3 constituting the insoluble anode.

As illustrated, the shaft 9 for the cathode 11 and the shaft 41 for the winding roll 21 are driven from the power or drive shaft 43. As shown, the shaft 43 is driven from the shaft 41 by a chain and sprocket drive 45, while the shaft 11 is driven from the shaft 41 by a chain and sprocket drive 47. The several bearings 49 supporting the shaft 41 and the several bearings 51 supporting the shaft 43 are mounted on separate piers 53 carried on the floor of the plant, these piers preferably being of concrete, wood, or other material possessing sufficient insulating properties for the low electrical potentials involved. It will be observed that by reason of this construction, and by reason of the fact that the bearings for the cathode shaft 9 and guide roll 25 are supported on insulated bars 7, and by reason of the washing tank 22 being formed of insulating material and supporting the rolls 23 and 26, the sheet S is ineffective to form a shunt circuit between the cathode and insoluble anode, thus causing the depositing current to pass through the electrolyte in the space between the cathode and anode.

Having briefly described the plating unit or cell, the latter more fully described in the above mentioned pending application, one form of plant in which the units may be employed will now be described. As illustrated (see particularly Figs. 1 and 10), the plant comprises two rows of cells 1, a common drive shaft 41, hereinbefore mentioned, being provided for each row of cells, each drive shaft having insulated couplings 55 between each two cells, as illustrated in Fig. 11, the insulated couplings being indicated schematically in Fig. 1. As shown, the drive shaft 41 is driven by a motor 57 through a speed reduction gearing contained in the casing 59 and a chain 61 and cooperating chain sprocket wheels. The steam pipes 24, which likewise are common to each row of cells, are provided with insulated couplings 63 (Figs. 9 and 11), said couplings being schematically illustrated in Fig. 1. The couplings 55 and 63 act to prevent shunt circuits between the several cells by way of the shafts 41 and steam pipe 24.

Referring to Fig. 16, which shows the wiring diagram for the several cells, the bus-bar 39 connected to the cathode of each cell, as shown in Figs. 11 and 13, is a continuation of the conductor 29 connected to the bus-bar 28 for the insoluble anode trough of the next adjacent cell, except for the two end cells, in which latter cases the conductor 29 of one end cell is connected to the positive terminal of a generator 65, which latter preferably is of the constant current type, while the bus-bar 39 of the opposite end cell is connected to the negative terminal of said generator. As a result of this construction, due to the drop in potential through the several cells connected in series, each cathode is negative relative to its cooperating insoluble anode, and due to the insulation between each two cells, hereinbefore described, the same plating current passes through the swiftly flowing stream of electrolyte between each cathode and its cooperating insoluble anode, and, the metal content of the electrolyte being maintained the same for each cell, as will hereinafter be described, and the cathode being driven at the same speed, each cell will produce sheet material at the same rate and of the same thickness, which for economic reasons is of exceeding importance in a commercial plant.

As shown, the several discharge chutes 17 for the cells deliver the electrolyte to elongated troughs 67 extending the length of the rows of cells, these troughs being slightly inclined from right to left, as viewed in Figs. 1 and 6, and discharging into troughs 69 from which they are separated by partition walls 71, a central partition wall 73 separating the two troughs 69. These troughs may conveniently be formed of wood lined with lead, or concrete lined with acid resistant brick coated with mastic or other waterproof acid resistant material.

The electrolyte, flowing into the troughs 69 through the openings 75 provided by the terminal portions of the partitions 71, flows through said troughs and discharges into sumps 77, a separate sump preferably being provided for each trough 69. From the sumps 77 the electrolyte is pumped by pumps 79 through conduits 81 to elevated distributing troughs 83 which extend lengthwise of the rows of cells, the troughs 83 preferably being formed of wood and interiorly lined with lead or other acid resistant material. The conduits 13 for delivering the electrolyte to the cells receive their supply of electrolyte from the distributing trough 83, these conduits, for preventing short circuits between adjacent cells, preferably being of ceramic material, except for their portions 85 adjacent the troughs 83, which portions preferably are of lead and are provided with flanges 87 (Fig. 12) "burned" to the lead lining 89 of said trough so as to form an electrolyte tight joint. As shown by Fig. 12, for interrupting the supply of electrolyte to any particular cell, the conduit 13 thereof may be closed from communication with the trough 83 by use of a suitable stopper 91 carried on the end of a rod 93, the operator grasping the rod 93 and using it to apply the stopper to the end of the conduit and to remove it therefrom when desired. Preferably, the stopper 91 and the rod 93 are formed of lead or other material inert with respect to electrolyte.

The troughs 83 have bottom walls which preferably are slightly inclined from one end thereof to the other to facilitate drainage. For keeping a constant head of electrolyte on the several conduits 13 for supplying electrolyte to the several cells, the troughs 83, at the ends thereof remote from the conduits 81, through which latter the electrolyte is pumped into said troughs, are provided with overflow dams or weirs 95 (Figs. 1, 4 and 5), sufficient electrolyte normally being pumped into the troughs to maintain such level L of the electrolyte that the latter will slightly overflow the weirs when all cells are in use. The electrolyte which overflows the weirs passes from the troughs 83 through conduits 97 and discharges into the ends of the troughs 67 and 69. As best illustrated by Fig. 5, the weirs 95 consist of lead portions 99 burned to the lead linings 89 of the troughs 83, the upper portions 101 being removable, and to this end being provided at their lower ends with spaced portions 103 adapted to embrace the upper edges of the portions 99. By reason of this construction, the upper portions 101 of different heights may be substituted for varying the height of the weir which in this respect is in substance vertically adjustable. As illustrated, each trough 83 is provided with several spaced baffles 104 extending from above into the electrolyte so as to prevent wave effects along the surface of the electrolyte.

The electrolyte is replenished with metal bearing material in its flow through the troughs 69, insufficient metal bearing material, preferably in the form of metal scrap, being distributed over the floor of the trough to form a thin layer or body 105 of replenishing material. Preferably, the troughs are wide so as to form a shallow stream of electrolyte which affords a considerable surface of exposure of electrolyte to the replenishing material. As shown, for preventing washing of the replenishing material into the sumps 77, the troughs 69 at the discharge ends thereof are provided with coarse screens 107 (Figs. 1 and 7), while between the screens and the sumps are provided traps for catching any replenishing material which may be washed past the screens, said traps being in the form of depressions 109 in the troughs having extending thereacross a series of spaced partitions 111 so as to form a series of catch basins 113.

As shown, a series of pumps 79 are provided, each of which is arranged in a separate compartment 115 so as to isolate each pump from the other to prevent possible leakage from one pump flooding the entire space provided for the pumps. As shown, the pumps are driven from a common shaft 117 driven by a motor 119, the latter having thereon the pump driving pulleys 121 connected by belts 123 to the driving pulleys 125 of the pumps, suitable clutches 127 controlled by the clutch levers 129 being provided for operatively connecting or disconnecting, as desired, the pulleys 121 from the shaft, so that any desired pump may be rendered inoperative.

The electrolyte flowing through the body of electrolyte replenishing material in the troughs 69 is effective to replenish the electrolyte to prevent depletion of the metal content thereof. The density of the electrolyte may be measured from time to time with a hydrometer at the inlets to the discharging troughs 83, and the amount of replenishing material in contact with the electrolyte may be regulated to keep the density of the electrolyte within desired limits. In practice, when employing an acid copper sulphate electrolyte for depositing sheet copper, satisfactory results will be obtained by maintaining the copper sulphate concentration between 6 and 10 ounces of copper per gallon and the acid concentration between 8 and 18 ounces sulphuric acid per gallon, the acid content being increased as the copper content is diminished.

Practically, the concentration of the electrolyte may be maintained substantially constant by addition of copper bearing material from time to time in accordance with the hydrometer observations, the rate of decrease in density indicating the amount of copper bearing material necessary to be added from time to time. It will be understood, however, in this connection, that the rate of solution of copper to a large extent depends upon the area of the copper surface exposed to the electrolyte, and that less weight of copper will be added when it for example is in the form of thin sheet scrap than if it were in granular form as is the case with jig concentrate, or in the form of larger pieces such as miscellaneous copper parts.

Copper, it has been found, is dissolved but slowly in dilute sulphuric acid. However, in the apparatus arranged according to applicant's invention, the rate of solution is fairly rapid, and this effect is believed to be due to the presence of nascent oxygen liberated from the electrolyte in the depositing cells, such oxygen being carried with the circulating stream of electrolyte, and, in effect, serving to activate the sulphuric acid content in respect to the action of the latter in dissolving copper.

For further regulating the rate of deposition, means may be provided for varying the temperature of the electrolyte. Conveniently for this purpose, the sump 77 may be provided with a steam coil 131 at the portion thereof adjacent the trough 69 containing the electrolyte replenishing material, and the distributing troughs 83 with steam coils 133. The temperature of the electrolyte may be controlled by more or less restricting the flow of steam through these coils, say by use of throttle valves 135 and 137 associated with the steam lines supplying steam to the respective coils. In practice, if the metal content of the electrolyte should, for example, show signs of increasing too rapidly, so as soon to exceed the desired maximum metal concentration, the temperature of the electrolyte may be slightly reduced so as to decrease the rate of solution of copper. It has been found that satisfactory results may be secured by designing the apparatus to maintain electrolyte temperatures between 120° and 135° F.

Preferably the apparatus is designed to be substantially automatic in respect to maintaining the metal content of the electrolyte within fixed limits. To this end the volume of electrolyte employed preferably is in excess of the capacity of the cells, the excess electrolyte flowing over the weirs 95 and circulating through the body of electrolyte replenishing material, and thus acting to dissolve metal from said body very slowly, while the portion of the electrolyte which passes through the cells becomes charged with atomic oxygen and acts to dissolve this metal fairly rapidly. Thus the two streams of electrolyte dilute each other, with the result that if the flow of electrolyte through one of the cells is interrupted (and the anode and cathode electrodes of that cell placed in electrical communication for maintaining the continuity of the circuit), less atomic oxygen and sulphuric acid will be generated for the series of cells, and more electrolyte will pass over the weirs 95, and consequently less metal will be dissolved from the body of electrolyte replenishing material. Under these conditions, the metal content of the electrolyte may slightly change, but by employing a sufficient total volume of electrolyte this change will be made so small that it may be readily corrected by adjusting the temperature of the electrolyte.

It will also be observed that the flow of electrolyte may be controlled by the several pumps. By varying the speed of these pumps, or by throwing one of them in and out of operation, the amount of electrolyte pumped may be varied. In practice, satisfactory results may be secured with a flow which will cause the electrolyte but slightly to flow over the weirs 95, the parts being proportioned to secure a minimum change in depth of the electrolyte in the distributing troughs 83 through the range of capacity of the pumps. Thus the head of electrolyte in the several conduits 13 will remain nearly constant, and, as each cell preferably is of like design, the same amount of electrolyte is supplied to each cell. Practically all the deposition of metal on the cathodes occurs from the electrolyte in the spaces between said cathodes and the arcuate portions 18 of the troughs 3, the increased resistance through the electrolyte in the channels 19 preventing any material deposition from the electrolyte in said channels. Thus the rate of deposition in each cell is independent of slight variations in the amounts of electrolyte supplied the several cells.

It has been found that the "temper" of the copper produced may be controlled by varying the temperature of the electrolyte, for example, in the above example, a temperature of about 90° F. will produce hard copper and a temperature of 140° F. soft copper, temperatures intermediate these producing copper of intermediate hardness. In the practice of the invention, it has been found that where large volumes of electrolyte are employed, the rate of replenishment of the electrolyte may be adjusted, as above described, by changing the temperature of the electrolyte for a short time without materially affecting the "temper" of the copper produced. Where the time available is not sufficient to correct the metal content of the electrolyte without materially affecting the desired temper of the copper, the volume of the electrolyte pumped may be altered for the purpose, the heights of the weirs 95 changed, until the remaining amount of electrolyte replenishing material in the troughs 69 has decreased to such extent to reestablish stable conditions.

As an example of the practice of the invention, but without limitation thereto, I have found that satisfactory results may be obtained with cathodes about 24 inches in diameter and 60 inches long, the arcuate portion of the insoluble anode trough corresponding to about 120° of circumference of the cathode surface, the latter being spaced from the insoluble anodes about five-eighths of an inch. In this example, the electrolyte contained about 9.0 oz. of copper per gallon in the form of copper sulphate, with about 10 oz. of sulphuric acid per gallon. The flow of electrolyte through each unit was about 350 gallons per minute and the current density was about 225 amperes per square foot, the total voltage impressed on each cell being roughly about three volts. In this example the troughs 69 containing the electrolyte replenishing material were about 175 feet long and 4 feet wide, the electrolyte stream in the trough being about 11 inches deep, with about 12,000 pounds of electrolyte replenishing material in the form of coarse copper scrap distributed on the bottom of said trough to the full width thereof through a distance of about 85 feet, making a thickness of scrap of about six inches. It has been found by this example that by rotating the cathodes at a speed of about one revolution per hour, each cell produced copper foil of about 0.005 inch in thickness, the thickness of the foil being uniform throughout the several cells.

It will be understood that wide deviations may be made from the apparatus and the particular steps of the method herein described and from the quantitative values herein given without departing from the spirit of the invention.

I claim:—

1. Apparatus for producing sheet metal by electrodeposition comprising a plurality of cells electrically connected in series having insoluble lead anodes and moving cathodes, means for circulating electrolyte in contact with a body of electrolyte replenishing material and through said cells in parallel, means for interrupting the flow of electrolyte through one or more of said cells while continuing the flow of electrolyte for those cells in contact with said body of replenishing material, and overflow means for maintaining the amount of electrolyte supplied each remaining cell substantially constant.

2. Apparatus for producing sheet metal by electrodeposition comprising a plurality of cells electrically connected in series having insoluble lead anodes and moving cathodes, means for circulating electrolyte in contact with a body of electrolyte replenishing material and through said cells in parallel, means for interrupting the flow of electrolyte through one or more of said cells while continuing the flow of electrolyte for those cells in contact with said body of replenishing material, and means for maintaining substantially constant the effective amount of electrolyte flowing through each cell.

3. Apparatus for producing sheet metal by electrodeposition comprising a plurality of cells electrically connected in series having insoluble lead anodes and moving cathodes, means for circulating electrolyte in contact with a body of electrolyte replenishing material and through said cells in parallel, means for interrupting the flow of electrolyte through one or more of said cells while continuing the flow of electrolyte for those cells in contact with said body of replenishing material, and means for controlling the rate of replenishment of the electrolyte by varying the temperature thereof.

4. Electrolytic apparatus having, in combination, an electrolytic cell, an elevated container for electrolyte for discharging electrolyte into said cell, means comprising an overflow-weir for said container for by-passing excess electrolyte around said cell, and means for circulating the electrolyte through said cell and container.

5. Electrolytic apparatus having, in combination, an electrolytic cell, an elevated container for electrolyte for discharging electrolyte into said cell, means comprising an overflow weir for said container for by-passing excess electrolyte around said cell, and means for circulating the electrolyte through said cell and container and a body of metal bearing material through which said electrolyte is passed when circulated.

6. Electrolytic apparatus comprising a plurality of electrolytic cells, an elevated electrolyte container for supplying electrolyte to said cells, means for collecting the electrolyte discharged from said cells and returning it to said container, said means comprising an elongated conduit having a body of metal bearing material distributed therein through which the electrolyte passes in a shallow stream, and means for maintaining a substantially constant head of electrolyte in said container comprising an overflow-weir for discharging electrolyte into said means for collecting the electrolyte and returning it to said container.

7. Electrolytic apparatus comprising a plurality of electrolytic cells, an elevated electrolyte container for supplying electrolyte to said cells, conduit means for collecting the electrolyte discharged from said cells and returning it to said container, and means for maintaining a substantially constant head of electrolyte in said container comprising overflow-weir means for discharging electrolyte from said container to said conduit means.

8. Electrolytic apparatus having, in combination; a plurality of electrolytic cells each having a cathode partly submerged in the electrolyte, an anode the active portion of which is wholly submerged in the electrolyte, and means for conducting through each cell the excess electrolyte over that necessary to submerge said active portion of said anode; a common electrolyte container for supplying electrolyte to said cells, and means for collecting the electrolyte discharged from said cells and returning it to said container.

9. Electrolytic apparatus having, in combination, a plurality of electrolytic cells; each cell comprising a trough of arcuate cross-section constituting an anode, a cylindrical cathode concentric with the arcuate portion of said trough, and conduit means for conducting through said cell without deposition therefrom on said cathode the electrolyte in excess of that necessary to fill said trough; and means for simultaneously supplying electrolyte to all said cells.

10. Electrolytic apparatus having, in combination, a plurality of electrolytic cells each comprising an anode and a movable cathode, a common drive shaft for said cathodes, and means for insulating from each other the portions of said drive shaft associated with each cell.

11. Electrolytic apparatus having, in combination; a plurality of electrolytic units each comprising an anode, a rotating cathode, and mechanism for stripping an electro-deposited sheet from said cathode, a common driving means for said cathodes and said mechanisms of said units, and means for insulating from each other the portions of said driving means associated with the respective units.

12. Electrolytic apparatus having, in combination; a plurality of electrolytic units each comprising an anode, a rotating cathode, and mechanism for stripping an electro-deposited sheet from said cathode, the cathodes and anodes of said units being electrically connected in series, a common driving means for said cathodes and said mechanisms of said units, and means for insulating from each other the portions of said driving means associated with the respective units.

13. Electrolytic apparatus having, in combination, a row of electrolytic cells electrically connected in series, an elongated trough for distributing electrolyte to said cells, an elongated trough for collecting electrolyte from said cells, a trough parallel to and communicating with the last mentioned trough and adapted to contain a body of metal bearing material, and a pump for circulating electrolyte through said troughs and cells.

RICHARD A. WILKINS.